United States Patent Office 2,778,123
Patented Jan. 22, 1957

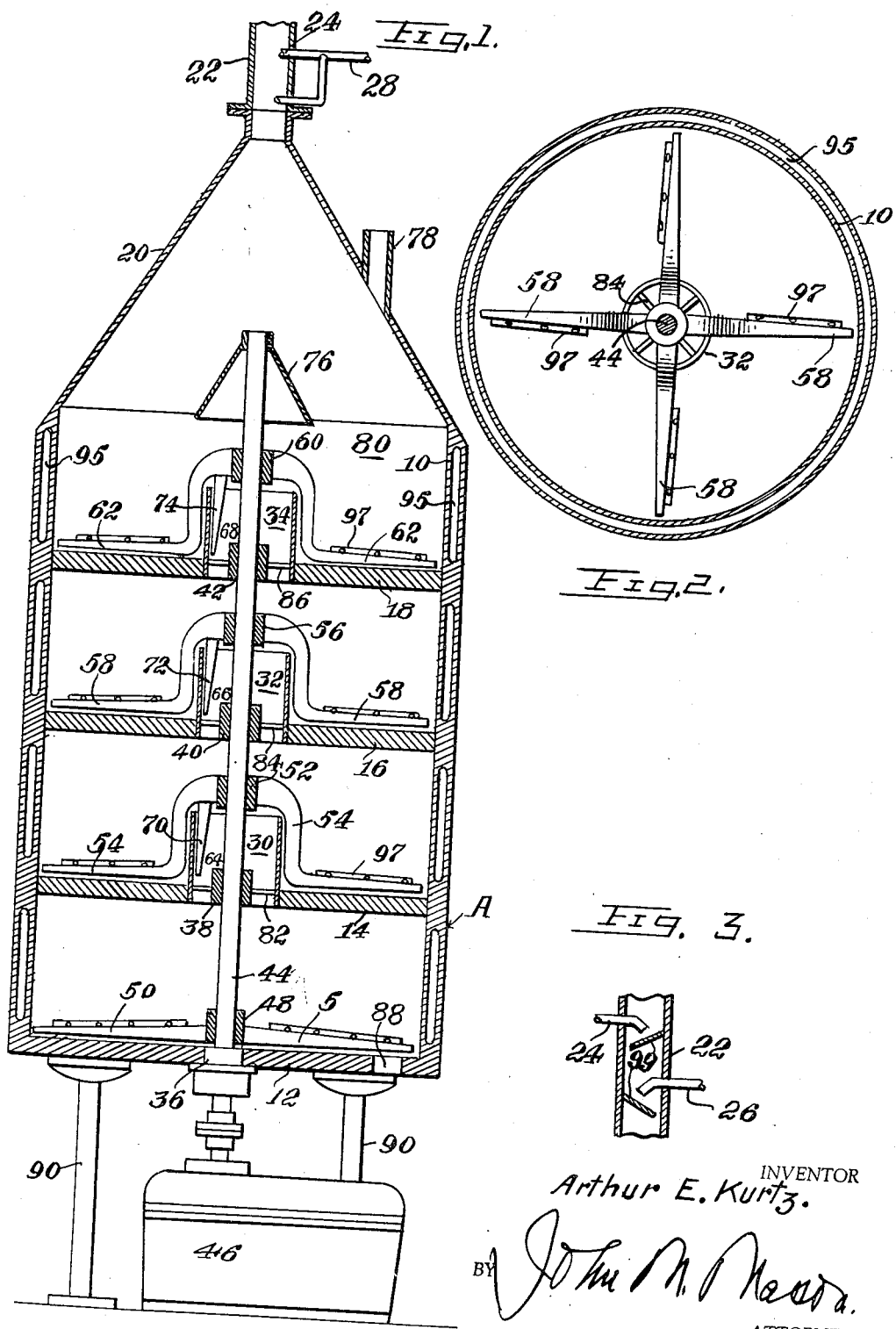

2,778,123

APPARATUS AND METHOD FOR SEPARATING SOLIDS, SOLVENTS, AND GASES

Arthur E. Kurtz, Willow Street, Pa., assignor, by mesne assignments, to Wurster & Sanger, Inc., a corporation of Illinois Application September 27, 1954, Serial No. 458,528

10 Claims. (Cl. 34—32)

This invention relates to apparatus and to a method for separating a solvent from solids and although it may be used for separating various solvents from solids, it is particularly adapted for the extracting of solvent used in the usual oil extraction equipment for separation of oil from oleaginous materials.

An object of the invention is to improve the method, and construction of the apparatus, particularly as it relates to the method and/or means for conveying dust laden vapors from the solid material.

Another object is the provision of a novel means and method for applying a counter-current solvent spray to the ascending vapors.

A further object is to provide novel means and method for separating the dust particles from the ascending vapors.

Yet another object is to provide a construction which includes means for causing a counter-current flow of gases which, however, omits the usual dust separating structure wherein baffles and other means are employed for separating the dust particles.

A further object is to provide a novel chimney construction for the ascending vapors.

Yet another object is to provide in connection with the structure disclosed, scraping means located in vertical spaced relationship to said chimney construction for removing the dust particles at different vertically spaced stations as the dust laden gases move upwardly.

Another object is the provision of a means and method whereby the solvent vapor and moisture vapor move upwardly through a vertically spaced hearth, i. e., through a central tube with the vapor moving in a counter-current flow to the liquid solvent from the top of the desolventizer and with the solvent liquid carrying with it any dust particles entrained in the upwardly moving vapor. The vapor may be subsequently passed through a condenser and reused, without first being passed through dust separating or cleaning equipment.

A further object is to provide a method and/or apparatus for causing the vapor coming from the central tube to enter a larger area at the top of the desolventizer to thereby reduce the velocity of the vapor before the vapor passes through the vapor duct. This change in velocity causes the heavier solid particles entrained in the vapor to drop back onto the surface of the uppermost hearth.

Other objects will appear hereinafter throughout the specification.

In the drawings:

Figure 1 is a schematic vertical section of the desolventizer with the agitating means and drive means therefor, shown in full lines.

Figure 2 is a horizontal section of the desolventizer shown in Figure 1, and

Figure 3 is a schematic vertical section of a modified detail of the desolventizer shown in Figure 1.

In the separation of oil from oleaginous materials by means of solvent extraction, it is necessary for maximum economy to recover the solvent from the solids fraction. As practiced by those skilled in the art, this is done usually by applied heat to vaporize the solvent with the gases being confined and conducted through pipes or ducts to suitable condensing apparatus for reuse of the solvent in liquid form.

In all cases and particularly when the solids portion must be finely divided for best yields or when the solid materials are extremely friable, the matter of dust entrainment in the vapor stream exceeds the nuisance range and becomes a serious factor in plane operation on design. Frequently elaborate flue and wet dust separation systems are designed and operated to permit continuous functioning of the process. Difficulties are compounded when, as is usually the case, the solids are proteinaceous and the solvent vapor contains water or water vapor in azeotropic or greater proportions. These materials are water soluble and tend to adhere to any wetted surfaces such as surfaces of condensation and require heating or mechanical cleaning to maintain operating conditions.

In typical devices in current use, the vapor flues or ducts are separate channels within or without the heating equipment and the use of manual or mechanical cleaning methods is unsatisfactory and expensive.

Referring to the drawings, A indicates the desolventizer as a whole. The unit consists of an outer shell 10 which is generally cylindrical. The shell is provided with a hearth 12 which may be welded or otherwise rigidly secured to the shell. Located above the hearth 12 are a series of verticaly spaced hearths 14, 16 and 18. The desolventizer has been illustrated with four hearths but it is to be understood that the number is optional and not limiting.

The upper end of the unit is provided with a cone 20 which joins the upper end of the cylindrical portion of the shell with the vapor duct 22. Located preferably in the vapor duct are one or more spray jets 24 and 26 that are fed from the spray pipe 28 connected, in conventional manner, with a source of solvent, such as hexane, supply.

Each of the hearths 14, 16 and 18 is provided adjacent the central portion thereof with an aperture in which is mounted the chimneys 30, 32 and 34, respectively.

The hearths 12, 14, 16 and 18, which may be rigidly supported on the shell 10, are provided with bearings 36, 38, 40 and 42, respectively, for supporting the vertically mounted shaft 44. Actually this shaft may be supported by any suitable means and is driven by the electric motor 46, a suitable reduction gearing being employed in order to insure that shaft 44 will rotate at any desired speed or a variable speed arrangement may be utilized.

Mounted adjacent the lower hearth of the desolventizer or cooker are the bosses 48 which rigidly support the sweep arms 50, two or more of which may be provided. Mounted above the chimney 30 are bosses 52 for rigidly supporting the anchor type sweep arms 54. In the same manner bosses 56 support sweep arms 58, and bosses 60 support sweep arms 62.

One or more cleaning elements or scrapers 64, 66 and 68 are mounted on sweep arms 54, 58 and 62. These are mounted adjacent the bosses which support the sweep arms and they extend downwardly in close proximity to each of the chimneys 30, 32 and 34 in order that their vertically projecting edges 70, 72 and 74 will rotate in close proximity to the inner peripheries of the chimneys 30, 32 and 34.

The upper end of the shaft 44 is provided with a dispersal cone 76, and the upper portion of the unit as defined by the cone 20 is provided with an inlet 78 for the solid material which latter may be substantially oil free oil seed solids, such as cottonseed, soybean, linseed oil meal, cocoa bean waste, castor-bean pomace, etc.

Each of the bearings 38, 40 and 42 is supported by one or more brackets or web plates 82, 84 and 86 and the unit 10 is supported by a plurality of legs or pedestals 90.

The gases which ascended up the vapor duct 22 are led to a condenser, not shown, where the condensate thereof may be recovered for reuse.

The unit 10 could also be utilized as a cooker of cottonseed meal and the like and many of the additional parts or structure of the unit used in desolventizing are well known in the art and conventional. For example, each of the chambers defined by hearths 12, 14, 16 and 18 are steam jacketed as in U. S. patents to Trace No. 1,910,485, French No. 1,015,013, Carr No. 1,082,303 and French No. 1,091,055 and these steam chambers have been represented schematically as at 95. Similarly, in desolventizing, steam should be fed to the interior of the chambers defined by the hearths and injected into the meal. This may be done in several ways well known in the art, such as by rotating or fixed sparge pipes. Further, and for purposes of illustration herein, perforated steam supply pipes 97 may be secured to rotate with the sweep arms 54, 58 and 62 and be supplied with steam through central shaft 44 as in U. S. patent to Davidson No. 1,782,714. Pipes 97 may be connected to sweep arms 50, if desired.

As previously stated, incoming meal enters at 78 and falls on hearth 18 and the flow of meal from one hearth to the next must be controlled. This may be done by means well known in the art, as illustrated in said patents, and preferably by control of the level attained in each hearth through the sensing elements of the gate control linkages. Gate controlled means is also employed in connection with outlet means 88 for the treated meal.

Operation

Assuming that each of the hearths is provided with a layer of material to be treated, such as solvent wet material, and that the unit has been previously heated to operating temperature by the steam in the jackets 95 and sparges 97, the unit is maintained at this temperature by a suitable control such as a thermostatic control, not shown.

The motor 46 is started and the material is agitated as it rests on each of the hearths by the several sweep means or agitating members 50, 54, 58 and 62. As the temperature of the charge material increases vapors will be released, the compositions of which will vary in accordance with the vapor pressures of the various components of the liquid present attaining azeotropic proportions for the pressure and temperature conditions maintained. These moisture and solvent vapors in the case of hearths 12, 14 and 16 will pass upwardly through chimneys 30, 32 and 34, respectively, and out into the enlarged space 80 that is defined by the cylindrical portion of the interior of the shell and by the cone 20 as well. As the gases ascend some of the heavier solids particles in the vapor will precipitate and adhere to any surfaces of condensation such as the inner peripheries of the chimneys and thus are removed by the rotating scrapers 64, 66 and 68. As the gases ascend in space 80 they meet in counter-current flow the descending spray from the jets 24 and 26. Portions of the spray which fall on the external surface of the dispersal cone 76 are prevented from movement down the chimney 34 by this dispersal cone, and instead are deposited on the material which is being agitated on hearth 18. As a further function of cone 76, a secondary diffusion of liquid is accomplished through which ascending vapors must pass thus resulting in preliminary solids removal from the vapor steam.

The charge material, such as oil free solvent wet cottonseed meal, enters the unit by means of a conveyor, not shown, at the inlet 78, after passing through the usual type of solvent extraction equipment. The incoming meal drops onto the upper surface of the meal in the hearth 18 where it is treated with steam which issues from the apertures in sparges 97 as they rotate. This treatment is optional and the device may be operated with or without the use of steam treating, as desired. The same treatment takes place in hearth 16, the material being subjected to the rotating sweep arms while steam mingles with the agitated material. Following the treatment in hearth 16 the material falls on the meal in hearth 14 where the material is also subjected to agitation and steam treatment. After a predetermined interval controlled by the gates, not shown, the material is dropped to the lowermost hearth 12 where it is subjected to the agitating arms 50. Door 88, which is controlled, as previously explained, by the level of the material on hearth 12 is then opened by conventional gate means and the treated meal is moved by the sweep arms 50 out of said outlet 88 usually to conventional conveying apparatus for further processing or storage.

In the present apparatus and method the solvent vapor and moisture vapor both leave each hearth through the central chimney or duct 30, 32, 34. As these vapors move upwardly they are met by the counter-current flow of the liquid solvents from the spray jets and cone 76 of the apparatus. The liquid solvent will carry with it any dust particles that had been entrained in the vapor, and the cleaned vapor is passed directly to a condenser and may be reused without further treatment in conventional vapor scrubbing equipment.

An added advantage is perceived in so arranging the vapor channels within the device that they may be mechanically cleaned continuously by the rotation of the agitating elements 64, 66 and 68 without the need of special equipment or operator attention. As shown, the scrapers 64, 66 and 68 continuously rotate with their outer edges 70, 72 and 74 moving closely adjacent to the inner periphery of the several chimneys. This construction prevents any accumulation of dust particles in the tubes or in the chimneys.

Another important feature of the invention is the alternate changes in velocity of the vapor coming through the central tube which enters the larger area at the top of the apparatus defined by the numeral 80 in Figure 1. This area causes upwardly moving vapor to abruptly change its velocity as it expands and enters the area defined by the inner walls of the cone 20. This change in velocity causes any heavy particles entrained in the vapor to drop back on the hearth 18. It is to be noted that the small diameter of duct 22 also results in a change of velocity of the vapor, the entire pattern of velocity being alternated from high to low to high. Actually, the purpose of small duct 22 is to confine the gases and insure contact with the spray liquid. In this latter connection, the duct 22 may take the form shown in Figure 3 which further insures proper contact. It can be seen, by referring to Figure 3, that the arrangement of baffles 99 and the outlets of tubes 24 and 26 at right angles thereto results in the vapor traveling in a tortuous path.

As the treating operation proceeds fresh solvent is continuously supplied through the jets 24, 26. This wash liquid may be the same as the solvent being recovered from the meal undergoing treatment, for example, hexane. The present device eliminates the need for a separate gas scrubber or separator and a separate pump for operating the same. Such separate equipment was necessary in all prior art devices known to me. When such a gas scrubber was used in prior constructions it was necessary to dispose of solids accumulated therein. This objectionable condition is avoided in the present construction and method, as the solids are not permitted to enter the vapor duct 22 as solids are directed back into the product meal stream.

It is to be understood that the apparatus and process disclosed is merely illustrative of the preferred embodiments and that such changes as fall within the purview of one skilled in the art may be made without departing from the spirit of the invention and the scope of the appended claims.

I claim:

1. An apparatus for separating a solvent from solid material comprising a desolventizer including a shell, a plurality of vertically spaced hearths mounted within said shell, the lowermost hearth closing the bottom of said shell against the ingress of air, said shell having an outlet for gases and an inlet for material extending through said shell above said hearths, an outlet for material from said shell, stirring means for stirring material deposited on said hearths, means forming a passageway extending substantially centrally through at least one of said hearths permitting upward movement of gases from beneath said last named hearth to the space above the same to said gas outlet, and means for rotating said stirring means comprising a shaft extending through said hearth passageway, said passageway having an upstanding chimney surrounding said shaft, and scraper means mounted on said shaft adjacent said chimney for removing dust deposited by the gases moving upwardly through said chimney, said scraper means comprising vertically extending members mounted in close proximity to the inside surface of said chimney.

2. An apparatus for separating a solvent from solid material comprising a desolventizer including a shell, a plurality of vertically spaced hearths mounted within said shell, the lowermost hearth closing the bottom of said shell against the ingress of air, said shell having an outlet for gases and an inlet for material extending through said shell above said hearths, an outlet for material from said shell, stirring means for stirring material deposited on said hearths, means forming a passageway extending substantially centrally through at least one of said hearths permitting upward movement of gases from beneath said last named hearth to the space above the same to said gas outlet, and means for rotating said stirring means comprising a shaft extending through said hearth passageway, means for supplying solvent to the material on said hearths in counter-current flow to the movement of said gases, said last mentioned means comprising one or more spray jets opening into said gas outlet so that the incoming solvent serves to separate solid particles from the gases as they pass upwardly through said gas outlet.

3. An apparatus for separating a solvent from solid material comprising a desolventizer including a shell, a plurality of vertically spaced hearths mounted within said shell, the lowermost hearth closing the bottom of said shell against the ingress of air, said shell having an outlet for gases and an inlet for material extending through said shell above said hearths, an outlet for material from said shell, stirring means for stirring material deposited on said hearths, means forming a passageway extending substantially centrally through at least one of said hearths permitting upward movement of gases from beneath said last named hearth to the space above the same to said gas outlet, and means for rotating said stirring means comprising a shaft extending through said hearth passageway, said passageway having an upstanding chimney surrounding said shaft, and scraper means mounted on said shaft adjacent said chimney for removing dust deposited by the gases moving upwardly through said chimney, means for supplying solvent to the material on said hearths in counter-current flow to the movement of said gases, said last mentioned means comprising one or more spray jets opening into said gas outlet so that the incoming solvent serves to separate solid particles from the gases as they pass upwardly through said gas outlet.

4. An apparatus for separating a solvent from solid material comprising a desolventizer including a shell, a plurality of vertically spaced hearths mounted within said shell, said shell having an outlet for gases and an inlet for material extending through said shell above said hearths, an outlet for material from said shell, stirring means for stirring material deposited on said hearths, means forming a passageway extending substantially centrally through at least one of said hearths permitting upward movement of gases from beneath said last named hearth to the space above the same to said gas outlet, and means for rotating said stirring means comprising a shaft extending through said hearth passageway, means for supplying solvent to the material on said hearths in counter-current flow to the movement of said gases, and a dispersal cone on said shaft for causing dispersal of said solvent within the space above said uppermost hearth and for causing said vapors to pass counter-current through the solvent during the time of its dispersal by said cone.

5. An apparatus for separating a solvent from solid material comprising a desolventizer including a shell, a plurality of vertically spaced hearths mounted within said shell, said shell having an outlet for gases and an inlet for material extending through said shell above said hearths, an outlet for material from said shell, stirring means for stirring material deposited on said hearths, means forming a passageway extending substantially centrally through at least one of said hearths permitting upward movement of gases from beneath said last named hearth to the space above the same to said gas outlet, and means for rotating said stirring means comprising a shaft extending through said hearth passageway, said passageway having an upstanding chimney surrounding said shaft, means for supplying solvent to the material on said hearths in counter-current flow to the movement of said gases, and a dispersal cone on said shaft for causing dispersal of said solvent within the space above said uppermost hearth and for causing said vapors to pass counter-current through the solvent during the time of its dispersal by said cone.

6. An apparatus for separating a solvent from solid material comprising a desolventizer including a shell, a plurality of vertically spaced hearths mounted within said shell, said shell having an outlet for gases and an inlet for material extending through said shell above said hearths, an outlet for material from said shell, stirring means for stirring material deposited on said hearths, means forming a passageway extending substantially centrally through at least one of said hearths permitting upward movement of gases from beneath said last named hearth to the space above the same to said gas outlet, and means for rotating said stirring means comprising a shaft extending through said hearth passageway, said passageway having an upstanding chimney surrounding said shaft, and scraper means mounted on said shaft adjacent said chimney for removing dust deposited by the gases moving upwardly through said chimney, means for supplying solvent to the material on said hearths in counter-current flow to the movement of said gases, and a dispersal cone on said shaft for causing dispersal of said solvent within the space above said uppermost hearth and for causing said vapors to pass counter-current through the solvent during the time of its dispersal by said cone.

7. An apparatus for separating a solvent from solid material comprising a desolventizer including a shell, a plurality of vertically spaced hearths mounted within said shell, said shell having an outlet for gases and an inlet for material extending through said shell above said hearths, an outlet for material from said shell, stirring means for stirring material deposited on said hearths, means forming a passageway extending substantially centrally through at least one of said hearths permitting upward movement of gases from beneath said last named hearth to the space above the same to said gas outlet, means for rotating said stirring means comprising a shaft extending through said hearth passageway, means for injecting steam into said material from said stirring means as the same is supported on said hearths, means for supplying solvent to said gas outlet, and a dispersal cone on said shaft for causing dispersal of said solvent onto the uppermost hearth.

8. An apparatus for separating a solvent from solid material comprising a desolventizer including a shell, a plurality of vertically spaced hearths mounted within said shell, said shell having an outlet for gases and an inlet for material extending through said shell above said hearths, an outlet for material from said shell, stirring means for stirring material deposited on said hearths, means forming a passageway extending substantially centrally through at least one of said hearths permitting upward movement of gases from beneath said last named hearth to the space above the same to said gas outlet, means for rotating said stirring means comprising a shaft extending through said hearth passageway, said passageway having an upstanding chimney surrounding said shaft, scraper means mounted on said shaft adjacent said chimney for removing dust deposited by the gases moving upwardly through said chimney, means for injecting steam into said material from said stirring means as the same is supported on said hearths, and means for supplying solvent to the material on said hearths, said means comprising one or more spray jets discharging into said gas outlet.

9. A process for separating a solvent from solids comprising the steps of feeding said solids downwardly to a series of vertically spaced hearths in a closed container while heating and stirring the solids on said hearths, injecting steam into said solids on said hearths, causing the gases to pass upwardly centrally through at least one of said hearths, flowing a solvent in counter-current to the upwardly moving gases, and permitting the expansion of said gases above the uppermost hearth.

10. A process for separating a solvent from solids comprising the steps of feeding said solids downwardly to a series of vertically spaced hearths in a closed container while heating and stirring the solids on said hearths, causing the gases to pass upwardly centrally through at least one of said hearths, flowing a solvent in counter-current to the upwardly moving gases, permitting the expansion of said gases above the uppermost hearth, and causing the downwardly moving solvent and upwardly moving gases to be dispersed towards the sides of said container as they pass in counter-current flow during at least one portion of the counter-current flow path.

References Cited in the file of this patent

UNITED STATES PATENTS

| | | |
|---|---|---|
| 668,210 | Powter | Feb. 19, 1901 |
| 1,666,617 | Caldwell | Apr. 17, 1928 |
| 2,049,199 | Dornfeld | July 28, 1936 |
| 2,554,109 | Langhurst | May 22, 1951 |
| 2,585,793 | Kruse | Feb. 12, 1952 |
| 2,663,089 | Coats | Dec. 22, 1953 |
| 2,695,459 | Hutchins | Nov. 30, 1954 |